United States Patent [19]

Fong

[11] Patent Number: 4,584,105

[45] Date of Patent: Apr. 22, 1986

[54] SCALE INHIBITORS FOR PREVENTING OR REDUCING CALCIUM PHOSPHATE AND OTHER SCALES

[75] Inventor: Dodd W. Fong, Naperville, Ill.

[73] Assignee: Nalco Chemical Company, Oak Brook, Ill.

[21] Appl. No.: 707,921

[22] Filed: Mar. 4, 1985

[51] Int. Cl.$^4$ ................................................ C02F 5/12
[52] U.S. Cl. .................................... 210/701; 252/180; 526/260
[58] Field of Search ................................ 210/698–701; 252/180, 181, 392; 422/16, 17; 526/260

[56] References Cited

U.S. PATENT DOCUMENTS

| | | | |
|---|---|---|---|
| 2,658,056 | 11/1953 | Ham | 526/260 |
| 2,798,061 | 7/1957 | Coover et al. | 526/260 |
| 2,828,223 | 3/1958 | McWherter et al. | 526/260 |
| 3,085,916 | 4/1963 | Zimmie et al. | 210/698 |
| 3,156,687 | 11/1964 | Andersen et al. | 252/180 |
| 3,392,169 | 7/1968 | Zienty | 210/698 |
| 3,482,980 | 12/1969 | Hayakawa et al. | 526/260 |

FOREIGN PATENT DOCUMENTS 1169176 6/1984 Canada ................................ 526/260

OTHER PUBLICATIONS

CA83(7):5816Br, N,N–Dialkylamide of Unsaturated Carboxylic Acids, Oct. 1973.

Primary Examiner—Peter Hruskoci
Attorney, Agent, or Firm—John G. Premo; Donald G. Epple

[57] ABSTRACT

Acrylic acid or acrylic acid/methacrylic acid is polymerized with between 5–95 mole percent of (meth)acryloyl morpholine to form polymers having a molecular weight range between 1,000–150,000. These polymers are extremely effective inhibitors for preventing calcium phosphate scale in boilers and on industrial heat exchangers. The above described water-soluble polymers are novel.

2 Claims, No Drawings

SCALE INHIBITORS FOR PREVENTING OR REDUCING CALCIUM PHOSPHATE AND OTHER SCALES

INTRODUCTION

Certain boiler waters and many industrial waters such as those used in the operation of cooling towers are treated with a variety of inorganic and organic phosphorous-containing compounds. Such treatments tend to produce calcium phosphate scales which adhere to the metal surfaces of boilers and metallic heat exchangers.

Many of the known organic scale inhibitors and scale dispersants, both inorganic and those containing water-soluble polymers, while being effective against a wide variety of scales, are not entirely effective against calcium phosphate scales.

Pure calcium phosphate scales may exist as such but frequently are found as contaminants of calcium carbonate and calcium or magnesium salt scales. When such scales contain at least 10% of calcium phosphate, they are suitable for treatment with the scale inhibitors of the invention as will be more hereinafter defined.

THE INVENTION

A method of inhibiting scales generally and specifically and preferably calcium phosphate scale in boilers and industrial cooling systems which comprises treating the water present in such systems with a few ppm of a co- or terpolymer of (meth)acryloyl morpholine. The comonomer is a carboxylate-containing vinyl monomer. Examples of the comonomers are acrylic acid, methacrylic acid, maleic acid, crotonic acid, isocrotonic acid and itaconic acid. The termonomer can be any vinyl monomer as long as the resulting terpolymer is water-soluble. Examples of the termonomers are methacrylic acid, maleic acid, itaconic acid, vinyl acetate, vinyl sulfonic acid, AMPS, acrylamide, N-alkanol acrylamide, N-alkyl acrylamide, methacrylamide, N-alkyl methacrylamide, methylacrylate, ethylacrylate, propyl acrylate, 2-hydroxyethyl acrylate and 2-hydroxy propyl acrylate. These polymers contain 5–95 mole percent of acryloyl morpholine and have a molecular weight within the range of 1,000–150,000.

In a preferred embodiment of the invention, the polymers contain between 10–30 mole percent of acryloyl morpholine. They preferably have a molecular weight range between 3,000–100,000.

The dosage necessary to inhibit calcium phosphate scale will vary from as little as a few ppm up to as much as 20 ppm or more. In many cases about 10 ppm gives good calcium phosphate scale inhibition. The ppm dosage is based upon the ppm of calcium phosphate contained in the scale-forming waters to be treated.

The exact mechanism by which the polymers of the invention work is not fully understood although they are believed to act as inhibitors of crystal growth as well as dispersants for fine particles of calcium phosphate present in industrial boilers or industrial cooling waters.

The invention also contemplates the above described water-soluble polymers as being novel compositions.

EXAMPLES

To illustrate the invention, the following are given by way of example:

Preparation of the Polymers

EXAMPLE 1

Acrylic acid (70 mole %)/Acryloyl Morpholine (30 mole %) Copolymer

A solution of acrylic acid (50.4 g), acryloyl morpholine (42.3 g), water and 50% NaOH (177.3 g) with a pH of 4.5 was charged into a 1.5 liter autoclave. The solution was heated to 124° F. in the presence of air. Ammonium persulfate (1.63 g) in water (10 g) and sodium bisulfite (4 g) in water (20 g) were added to the solution in sequence and the autoclave valves were quickly closed. Temperature of the reaction went up to 228° F. in 0.6 minutes and the polymerization was completed in 7 minutes.

G.C. analysis showed the sample contained 6700 ppm acrylic acid and 3900 ppm acryloyl morpholine. The molecular weight of the copolymer was 12,000 as determined by GPC method using polystyrene sulfonic acid standard.

EXAMPLE 2

Acrylic Acid/Acryloyl Morpholine Copolymer

A solution of acrylic acid (40.28 g), acryloyl morpholine (19.72 g) in water (340 g) was charged into a 1-liter, 4-neck round bottom reaction flask which was equipped with a mechanical stirrer, a thermometer, and a condenser. The solution was heated to 60° C. under nitrogen atmosphere. Ammonium persulfate (3 g) and sodium bisulfite (9 g) were added in sequence. Reaction temperature went up to 90° C. and gradually cooled to and maintained at 60° C. for two hours. At the end of the reaction, a small amount of gel was separated from solution and was separated.

The samples analyzed by G.C., G.P.C. and C-13 NMR were found to contain 450 ppm residual acrylic acid, 410 ppm residual acryloyl morpholine; the molecular weight of the copolymer was 11,200, and the composition of the copolymer was about 90 mole % acrylic acid and 10 mole % acryloyl morpholine.

EXAMPLE 3

Acrylic Acid (70 mole %)/Acryloyl Morpholine (30 mole %) Copolymer

A solution of acrylic acid (34.80 g), acryloyl morpholine (29.20 g), 50% sodium hydroxide and water (330.11 g) with a pH of 4.5 was charged into a 1-liter, 4-neck round bottom flask which was equipped with a mechanical stirrer, a thermometer, and a condenser. The solution was heated to 60° C. under nitrogen amosphere and ammonium persulfate (0.64 g) in water (10 g) and sodium bisulfite (1.92 g) in water (20 g) were added in sequence. The reaction was kept at about 65° C. for five hours.

The molecular weight of the copolymer was 90,100 as determined by GPC.

EXAMPLE 4

Acrylic Acid (80 mole %)/Acryloyl Morpholine (20 mole %) Copolymer

A solution of acrylic acid (40.28 g), acryloyl morpholine (19.72 g) in water (310 g) was charged into a 1-liter, 4-neck round bottom flask which was equipped with a mechanical stirrer, a thermometer, and a condenser. The solution was heated to 60° C. under nitrogen atmosphere, and ammonium persulfate (3 g) in water (10 g)

and sodium bisulfite (9 g) in water (20 g) were added in sequence. The reaction was maintained at 70° C. for three hours.

GPC analysis showed the copolymer has a molecular weight of 15,600.

EXAMPLE 5

Acrylic Acid (69 mole %)/Methacrylic Acid (19.2 mole %)/Acryloyl Morpholine (11.8 mole %) Terpolymer A solution of acrylic acid (30 g), methacrylic acid (10 g), acryloyl morpholine (10 g) in water (260 g) was charged into a 1-liter, 4-neck round bottom reaction flask which was equipped with a mechanical stirrer, a thermometer, and a condenser. The solution was heated to 65° C. under nitrogen atmosphere. Ammonium persulfate (2.5 g) in water (10 g) and sodium bisulfite (7.5 g) in water (20 g) were then added into solution in sequence. The reaction was maintained at around 65° C. for three hours.

The molecular weight of the polymer was 19,500 as determined by GPC.

EXAMPLE 6

Acrylic Acid (80 mole %)/Methacryloyl Morpholine (20 mole%) Copolymer

A solution of acrylic acid (42.60 g), methacryloyl morpholine (23.25 g) in water (319.98 g) was charged into a 1-liter 4-neck round bottom reaction flask which was equipped with a mechanical stirrer, a thermometer, and a condenser. The solution was heated to 60° C. under nitrogen atmosphere. Ammonium persulfate (3.29 g) in water (10 g) and sodium bisulfite (9.88 g) in water (20 g) were added in sequence. The reaction was maintained at about 75° C. for three hours.

Analyses showed the sample contained 2.9% residual acrylic acid and the molecular weight of the terpolymer was 3890.

In all the above preparations, the molecular weight of the polymers was between 3,000-150,000.

Testing of the Polymers as Calcium Phosphate Inhibitors

The following test method was used:

Procedure for o-PO$_4$ Filtration Test

(Ca$_3$)(PO$_4$)$_2$ Stabilization Test (Note all chemicals are reagent except for treatments)

1. Put 300 to 350 ml of DI water in the 600 ml jacketed beakers and let stand with mild stirring until temperature is brought to 150 degrees F. (70 degrees C.) by use of a constant temperature water bath.
2. Put in required ml of stock hardness into jacketed beakers: For 250 ppm CaCO$_3$ use 50 ml or any desired hardness
   To make 2 liters of stock solution:
   1. Dissolve 7.356 g CaCl$_2$2H$_2$O in 800 ml DI H$_2$O.
   2. Dissolve 6.156 g MgSO$_4$7H$_2$O in 800 ml DI H$_2$O.
   3. Add both solutions to 2 liter volumetric flask and dilute to volume.
   4. Shake well.
3. Add sufficient ml of treatment into jacketed beakers while stirring (normally 5 mls for 10 ppm concentration).
4. Add DI water to make 500 ml in jacketed beakers (add water to line on beaker with stirrer not operating).
5. With stirring, let solutions in beakers equilibriate to 158 degrees F.
6. With stirring, adjust pH to 8.5 with dilute (0.1-0.4N) NaOH.
7. Add 5 ml of 1000 ppm PO$_4$, pH-8.5 solution to jacketed beakers and wait about 3-5" while stirring.
8. Check pH of solution in beakers and as necessary adjust pH to 8.5± while stirring.
9. Let experiment run at 158 degrees F. with stirring for 4 hours.
10. After 15 minutes, check pH of solutions in beakers and as necessary adjust pH to pH 8.5±0.1. Also, check pH of solutions every 30 to 45 minutes thereafter.
11. After the 4 hours are up, the solution is immediately filtered through 0.45 micron filter paper under vacuum. The filtered solution is analyzed for o-PO$_4$ using standard procedure and the color is evaluated in the Spec at 700 nm.
12. The results are reported as percent inhibition calculated by the following formula:

$$\text{inhibition} = \frac{(\text{residual o-PO}_4) - (\text{blank residual o-PO}_4)}{(\text{initial o-PO}_4) - (\text{blank residual o-PO}_4)} \times 100$$

wherein:
initial-o-PO$_4$=o-PO$_4$ concentration in the mixture at the beginning of the experiment.
residual-o-PO$_4$=o-PO$_4$ concentration in the mixture at the end of the experiment with stabilizer.
blank residual-o-PO$_4$=o-PO$_4$ concentration is the filtrate at the end of the experiment with no stabilizer.

Calcium Carbonate Inhibition Test

The apparatus is based upon a Mettler automatic titration system. The E-px converter was calibrated according to the two buffer-two temperature method described in the Mettler DK12 E-px converter manual. This calibration allows the equipment to compensate the pH values for temperature changes over a range of 20°-70° C. The Mettler E-px converter output is 100 MV/pH unit. This signal is recorded as the *observed* MV change as the titration progresses, and the pH of the titration breakpoint is most readily obtained from the observed MV values. To convert over to *true* MV changes, multiply the observed MV change times the decimal equivalent of the value on the d E/d px dial. A standard pH 7 (pH 6.98 at 60° C.) buffer solution was prepared from Beckman buffer powder and employed to determine the −1 MV (true) reference point after each titration. A stock hardness solution containing 3600 ppm Ca$^{2+}$ and 2000 ppm Mg$^{2+}$ (equivalent to 20X Synthetic #3 PCT test water) is prepared using CaCl$_2$.2H$_2$O and MgSO$_4$.7H$_2$O. A 2200 ppm HCO$_3$ solution was prepared each day using NaHCO$_3$, and the 0.1N NaOH titrant is prepared using an Acculate reagent solution. To a 100 ml volumetric flask is added the inhibitor, hardness (20 mL), and bicarbonate (20 mL) solutions followed by dilution with distilled water. The solution is swirled gently to mix the reagents, then transferred to a 300 mL jacketed-Pyrex beaker maintained at 60° C. The initial reagent concentrations are 360 ppm Ca$^{2+}$, 200 ppm Mg$^{2+}$, 440 ppm HCO$^-$$_3$. Generally dosage preference curves are obtained using 5, 10, or 15 ppm inhibitor actives (0.5, 1.0, or 1.5 mL of stock solution). The test solution is stirred for 6 min. to allow for temperature equilibraton. Dispensing tip for the NaOH titrant is placed just above the test solution surface. Next, the pH electrode is lowered as far as possible into the solution, but maintaining clearance above the magnetic stirbar. The titrant is added at 0.3 mL/min (buret drive unit rate=2) until the strip-chart recorder indicates a small pH drop has occurred. It should be noted that many test solutions exhibit significant turbidity before the actual pH breakpoint (associated with massive $CaCO_3$ precipitation) is observed. If additional base was added a second break-point associated with $Mg(OH)_2$ precipitation usually is observed at higher pH values. After the breakpoint is reached, several mL of 10% HCl is added to the test solution to dissolve the precipitated $CaCO_3$. After each titration, the pH electrode is transferred to the standard pH 6.98 (−1 MV, true) buffer, which is maintained at 60° C., and this reference point is indicated on the recorder. After rinsing the jacketed-beaker with deionized water, a new test solution is added. A calibration check is made daily by titrating a test sample containing 10 ppm actives Dequest 2010* (~120 MV, true). Relative error of this titration method generally is ±1% (daily) and ±2% (weeks). Saturation ratios (S.R.) are calculated using the method as described by J. C. Westall, et al. entitled, "Mineol, A Computer Program for the Calculation of Chemical Equilibrium Composition of Aqueous Systems," Water Quality Laboratory, Ralph M. Parsons Laboratory for Water Resources and Environmental Engineering, Department of Civil Engineering, Massachusetts Institute of Technology, Technical Note No. 18, Sponsored by EPA Grant No. R-803738, July 1976, pp. 8–10.

*Hydroxy ethylidene diphosphonic acid.

TABLE I

Using the above test method, the following additional examples were run:

| Ex. | Polymer Composition | $MW^2$ | % Calcium Phosphate[1] Inhibition (Polymer Dosage) | | | | | $CaCO_3$ Saturation Ratio | | |
|---|---|---|---|---|---|---|---|---|---|---|
| | | | 5 | 7.5 | 10 | 20 | ppm actives | 10 | 15 | ppm actives |
| 7 | Sulfonated Styrene-Maleic acid (75/25) | 18,950 | 8 | — | 87 | — | | | | |
| 8 | Acrylic acid-Hydroxypropyl acrylate (75/25) | 7,350 | 13 | 75 | 92 | — | | | | |
| 9 | Acrylic acid-Acryloyl morpholine (70/30) | 12,600 | — | — | 82 | 84 | | 89 | 98 | |
| 10 | Acrylic acid-Acryloyl morpholine (70/30) | 90,100 | — | — | 45 | 77 | | 84 | 89 | |
| 11 | Acrylic acid-Acryloyl morpholine (80/20) | 15,600 | 11 | 65 | 96 | — | | 101 | 126 | |
| 12 | Acrylic acid-Acryloyl morpholine (90/10) | 11,200 | — | — | 97 | 100 | | | | |
| 13 | Acrylic acid-Methacrylic acid-Acryloyl morpholine (69/19.2/11.8) | 19,500 | — | — | 100 | — | | | | |
| 14 | Acrylic Acid-Methacryloyl Morpholine (80/20) | 5,770 | | | 16 | 98 | | | | |
| | Blank | | | | | | | 10 | 10 | |

[1]All screening tests were done using water containing 250 ppm of Ca (as $CaCO_3$), 125 pm Mg (as $CaCO_3$) and pH 8.5.
[2]Molecular weights were determined by GPC in aqueous solution using sulfonated polystyrene standard.
In the above examples, Examples 7 and 8 show prior art calcium phosphate inhibitors.

I claim:

1. A method of inhibiting calcium phosphate scales in boilers and industrial cooling systems which comprises treating the water present in these systems with an effective amount of meth-acryloyl morpholine and acryloyl morpholine copolymers which comprises 5–95 mole percent of meth-acryloyl morpholine and 95–5 mole percent of carboxylic acid containing vinyl monomer comprising acrylic acid, methacrylic acid, maleic acid, crotonic acid, and itaconic acid and which polymer has a molecular weight within the range of 1,000–150,000 to inhibit said calcium phosphate scales.

2. A method of inhibiting calcium phosphate scales in boilers and industrial cooling systems which comprises treating the water present in these systems with an effective amount of meth-acryloyl morpholine and acryloyl morpholine copolymers which comprises 5–95 mole percent of meth-acryloyl morpholine and 95–5 mole percent of (meth)acrylic acid and which polymer has a molecular weight within the range of 1,000–150,000 to inhibit said calcium phosphate scales.

* * * * *